United States Patent
Zehner

(10) Patent No.: US 6,590,004 B1
(45) Date of Patent: Jul. 8, 2003

(54) FOAM COMPOSITE WOOD REPLACEMENT MATERIAL

(75) Inventor: Burch E. Zehner, Gahanna, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 10/038,851

(22) Filed: Dec. 31, 2001

Related U.S. Application Data

(63) Continuation of application No. 09/576,091, filed on May 22, 2000, now abandoned.
(60) Provisional application No. 60/135,441, filed on May 22, 1999.

(51) Int. Cl.⁷ .............................. C08J 9/00; B29D 7/00
(52) U.S. Cl. ...................... 521/84.1; 521/79; 521/142; 264/45.9
(58) Field of Search ........................ 521/84.1, 79, 142; 264/45.9

(56) References Cited

U.S. PATENT DOCUMENTS 5,847,016 A * 12/1998 Cope
6,054,207 A *  4/2000 Finley

* cited by examiner

*Primary Examiner*—Morton Foelak
(74) *Attorney, Agent, or Firm*—Standley & Gilcrest LLP

(57) ABSTRACT

The present invention is a foam composite wood replacement material and a method for its manufacture. One embodiment of the present invention is a cellulosic/polymer foamable composite material. The composite material may include at least one cellulosic filler in the amount of about 20% to about 60% by weight and a plastic material in the amount of about 40% to about 80% by weight. The plastic material may include stabilizer(s) in an amount of about 1 to about 10 parts per 100 parts of a polymer resin, lubricant(s) in an amount of about 1 to about 12 parts per 100 parts of the polymer resin, process aid(s) in an amount of about 2 to about 15 parts per 100 parts of the polymer resin, and blowing agent(s) in amount of about 0.25 to about 5 parts per 100 parts of the polymer resin. Examples of the polymer resin are polyvinyl chloride and polypropylene. The foamable composite may be used to make structural components such as siding units.

20 Claims, 1 Drawing Sheet

FOAM COMPOSITE WOOD REPLACEMENT MATERIAL

This Application is a continuation of U.S. Application Ser. No. 09/576,091, filed May 22, 2000 now abandoned, which claims the benefit of U.S. Provisional Application No. 60/135,441, filed May 22, 1999. The entirety of each of these Applications is incorporated herein by reference.

BACKGROUND AND SUMMARY OF THE INVENTION

The present invention relates generally to a wood replacement material, and more particularly, to a foam composite wood replacement material. The present invention will be described primarily with reference to wood flour/polyvinyl chloride (PVC) foam composites. However, the present invention includes several different formulations and material composites including, but not limited to, PVC formulations that include an inorganic filler in addition to the cellulosic material.

The supply of natural woods for construction and other purposes is dwindling. As a result, many are concerned about conserving the world's forests, and the cost of natural woods has risen. In light of these factors, a tremendous demand has developed in recent years for cellulosic/polymer composites that exhibit the look and feel of natural woods.

Cellulosic/polymer composites are used as replacements for all-natural wood, particle board, wafer board, and other similar materials. For example, U.S. Pat. Nos. 3,908,902, 4,091,153, 4,686,251, 4,708,623, 5,002,713, 5,055,247, 5,087,400, and 5,151,238 relate to processes for making wood replacement products. As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites may be sawed, sanded, shaped, turned, fastened, and finished in the same manner as natural woods. Therefore, cellulosic/polymer composites are commonly used for applications such as interior and exterior decorative house moldings, picture frames, furniture, porch decks, deck railings, window moldings, window components, door components, roofing structures, building siding, and other suitable indoor and outdoor items.

Cellulosic/polymer foam composites can be an alternative to cellulosic/polymer solid composites. Cellulosic/polymer foam composites use significantly less polymer material than cellulosic/polymer solid composites. Therefore, in light of the ever increasing cost of polymer materials such as PVC, cellulosic/polymer foam composites can offer substantial cost savings.

Cellulosic/polymer foam composites commonly include foaming or blowing agents to facilitate the foaming process. However, such agents also increase the difficulty of adding cellulosic fillers. In particular, cellulosic fillers absorb moisture thereby increasing the viscosity of the composite. Moreover, cellulosic fillers do not foam. Consequently, the other materials foam around the cellulosic fillers.

These properties of cellulosic fillers can adversely affect the appearance, strength, and durability of a resultant product made of a cellulosic/polymer foam composite. As a result, a need exists for an improved cellulosic/polymer foam composition that can be shaped into a resultant product having desired appearance, strength, durability, and weatherability. A need also exists for an improved method of making such a cellulosic/polymer foam composite.

The present invention satisfies some or all of these needs. The present invention provides cellulosic/polymer foam composite materials that can be produced in a commercially reasonable environment. One example of the present invention is a cellulosic/PVC foam composite. The cellulosic/polymer foam compositions of the present invention can be processed and shaped into resultant products having desired appearance, strength, durability, and weatherability. Also, the present invention provides improved methods of making such cellulosic/polymer foam composites.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to a foam composite wood replacement material. The present invention also includes a method of manufacturing a foam composite wood replacement material. The foam composite wood replacement material can be used as a substitute for natural wood as well as cellulosic-filled and inorganic-filled polymer solid composites. For example, the foam composite of the present invention can be used to make interior and exterior decorative house moldings, picture frames, furniture, porch decks, deck railings, window moldings, window components, door components, roofing structures, building siding, and other suitable indoor and outdoor items.

Figure 2:
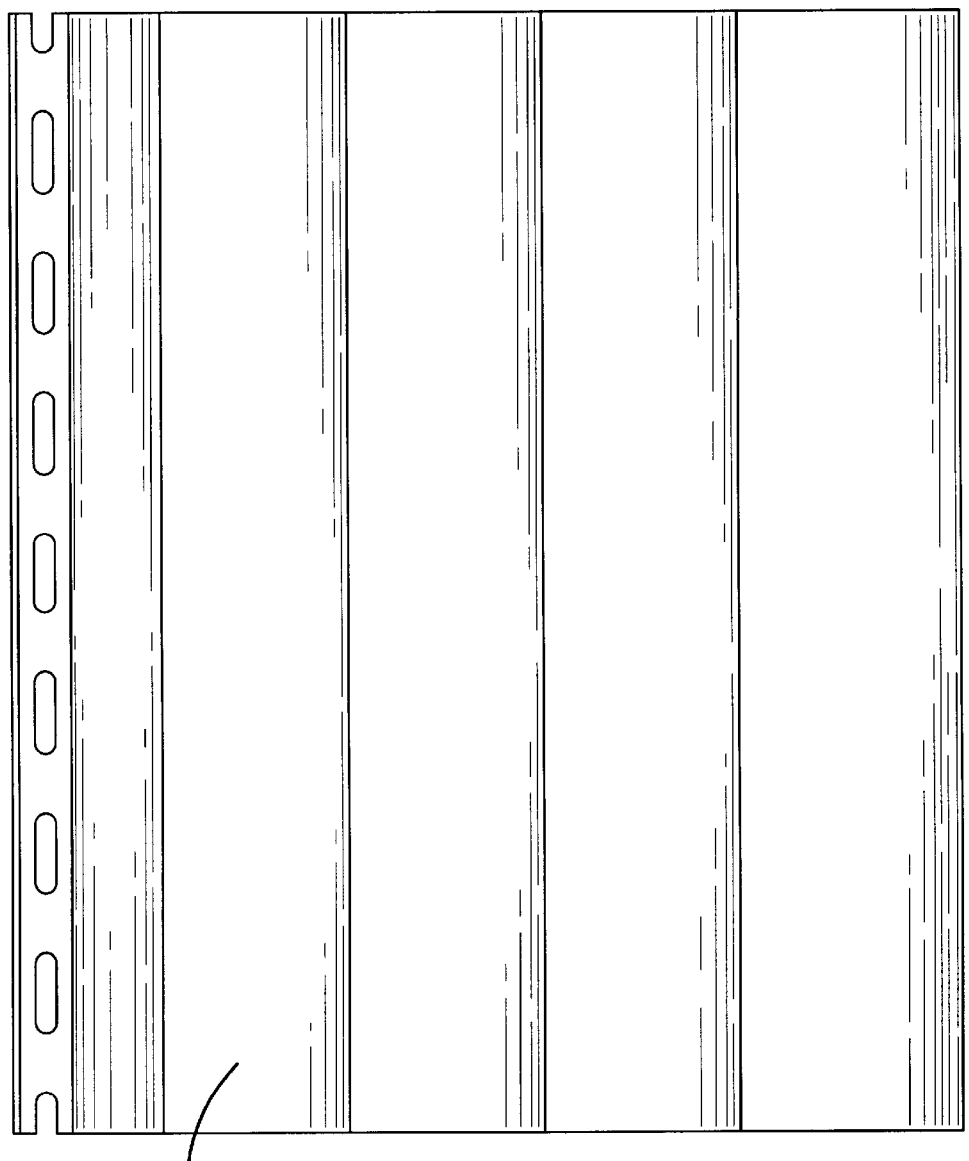
FIG. 2 is an exterior plan view of the siding unit of FIG. 1.
Figure 1:
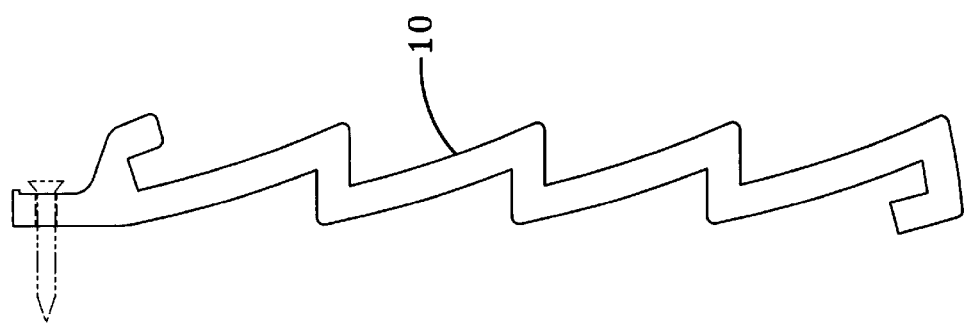
FIG. 1 is a side elevation view of a siding unit made with a foam composite of the present invention.

FIGS. 1 and 2 show an example of a siding unit 10 that can be made with a foam composite of the present invention. The siding unit 10 is comprised of two courses, i.e., four rows. However, it shall be understood that the siding unit 10 may be comprised of any desired number of rows or courses. It shall also be understood that a backer may be secured to the inside of the siding unit 10. The backer may be comprised of a sufficiently rigid, insulating material such as expanded or extruded polystyrene foam, fiberglass, cardboard, a fire retardant grade of polyurethane foam, or any other similar, suitable, or conventional material.

The materials that may be used to make the foam composite of the present invention include, but are not limited to, cellulosic fillers, polymers, inorganic fillers, cross-linking agents, lubricants, process aids, stabilizers, accelerators, inhibitors, enhancers, compatibilizers, blowing agents, foaming agents, thermosetting materials, and other suitable materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, and other similar materials. Examples of polymers include multilayer films, high density polyethylene (HDPE), polypropylene, PVC, low density polyethylene (LDPE), chlorinated polyvinyl chloride (CPVC), acrylonitrile butadiene styrene (ABS), ethyl-vinyl acetate, other similar copolymers, other similar, suitable, or conventional thermoplastic materials, and formulations that incorporate any of the aforementioned polymers. Examples of inorganic fillers include talc, calcium carbonate, kaolin clay, magnesium oxide, titanium dioxide, silica, mica, barium sulfate, and other similar, suitable, or conventional materials. Examples of cross-linking agents include polyurethanes, such as isocyanates, phenolic resins, unsaturated polyesters, epoxy resins, and other similar, suitable, or conventional materials. Combinations of the aforementioned materials are also examples of cross-linking agents. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers and other similar, suitable, or conventional materials.

One embodiment of the present invention is a cellulosic/PVC foam composite material. The composite material may include at least one cellulosic filler in the amount of about 20% to about 60% by weight, more preferably about 40% to about 50% by weight. The composite may also include a PVC material in the amount of about 40% to about 80% by weight, more preferably about 50% to about 60% by weight.

The cellulosic filler(s) may be dried to a desired moisture content. For example, the cellulosic filler(s) may be dried to about 0.5% to about 3% moisture content by weight, more preferably to about 1% to about 2% moisture content by weight. However, it is appreciated that the cellulosic filler(s) may have a moisture content less than about 0.5% by weight or greater than about 3% by weight.

The PVC material can be made by mixing a PVC resin, at least one stabilizer, at least one lubricant, at least one process aid, at least one blowing agent, and optional other ingredients in a mixer. An example of a mixer is a high intensity mixer such as those made by Littleford Day Inc. or Henschel Mixers America Inc. Another example of a mixer is a low intensity mixer such as a ribbon blender. The type of mixer may be selected to blend the ingredients at desired temperatures. After mixing, the ingredients of the PVC material may be cooled to a desired temperature.

The PVC material may include stabilizer(s) in an amount of about 1 to about 10 parts, more preferably about 3 to about 5 parts, per 100 parts of the PVC resin. The lubricant(s) may be present in an amount of about 1 to about 12 parts, more preferably about 3 to about 6 parts, per 100 parts of the PVC resin. The process aid(s) may be included in an amount of about 2 to about 15 parts, more preferably about 5 to about 10 parts, per 100 parts of the PVC resin. Also, the PVC material may include the blowing agent(s) in an amount of about 0.25 to about 5 parts, more preferably about 0.5 to about 2 parts, per 100 parts of the PVC resin. Optionally, at least one inorganic filler may be added in an amount of up to about 10 parts, more preferably up to about 5 parts, per 100 parts of the PVC resin.

The PVC resin may have any desired inherent viscosity. The inherent viscosity is preferably between about 0.6 and 1.1 and more preferably between about 0.7 and 0.9. Nevertheless, it is appreciated that the inherent viscosity of the PVC resin may be less than 0.6 or greater than 1.1.

The cellulosic filler(s) and the PVC material may be mixed together prior to being further processed such as by extrusion or molding. For example, a low intensity mixer or any other suitable, similar, or conventional mixer may be used to mix the cellulosic filler(s) and the PVC material. Again, an example of a low intensity mixer is a ribbon blender.

The foam composite material may be processed in an extruder, a compression molding apparatus, or any other suitable, similar, or conventional apparatus. An example of an extruder is a conical, twin screw, counter-rotating extruder with a vent. A force feed hopper or crammer or any other suitable, similar, or conventional apparatus may be used to feed the materials into the extruder. The composite material may be extruded through a die system. The die system may have any suitable compaction ratio. The die system may include an extended die land to provide sufficient back pressure for a uniform melt as well as compaction and shaping of the melt.

EXAMPLE

A foam composite was made which comprised about 35% by weight of a cellulosic filler and about 65% by weight of a PVC material. The PVC material was made by first mixing about 100 parts of a PVC resin and about 3 parts of a stabilizer to about 160° F. About 1 part blowing agent and about 3 parts lubricants were then added and mixed in to about 175° F. Next, about 9 parts process aid were added to the mixture followed by about 3 parts lubricant, and the combination was mixed and heated to about 200° F. Thereafter, the resulting composition was dropped to a cooler and cooled to about 130° F. The cellulosic filler and the PVC material were then mixed together and extruded and cooled to achieve a final net shape. The resultant product exhibited desired appearance, strength, durability, and weatherability. In addition, the final net shape possessed desired foam density and foam swell.

This is just one example of a method of making a foam composite material of the present invention. It should be recognized that the blending temperatures, times, and order may be varied to obtain the desired qualities of the resultant product.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims

What is claimed is:

1. A foamable composite comprising:
   at least one cellulosic filler in an amount of about 20% to about 60% by weight of said composite; and
   at least one plastic material in an amount of about 40% to about 80% by weight of said composite, said at least one plastic material comprised of at least one stabilizer in an amount of about 1 to about 10 parts per 100 parts of a polypropylene resin, at least one lubricant in an amount of about 1 to about 12 parts per 100 parts of said polypropylene resin, at least one process aid in an amount of about 2 to about 15 parts per 100 parts of said polypropylene resin, and at least one blowing agent in an amount of about 0.25 to about 5 parts per 100 parts of said polypropylene resin.

2. The foamable composite of claim 1 wherein said at least one cellulosic filler is in an amount of about 40% to about 50% by weight of said composite.

3. The foamable composite of claim 1 wherein said at least one cellulosic filler is wood flour.

4. The foamable composite of claim 1 wherein said at least one plastic material is in an amount of about 50% to about 60% by weight of said composite.

5. The foamable composite of claim 1 wherein said at least one stabilizer is in an amount of about 3 to about 5 parts per 100 parts of said polypropylene resin.

6. The foamable composite of claim 1 wherein said at least one lubricant is in an amount of about 3 to about 6 parts per 100 parts of said polypropylene resin.

7. The foamable composite of claim 1 wherein said at least one process aid is in an amount of about 5 to about 10 parts per 100 parts of said polypropylene resin.

8. The foamable composite of claim 1 wherein said at least one blowing agent is in an amount of about 0.5 to about 2 parts per 100 parts of said polypropylene resin.

9. The foamable composite of claim 1 wherein said at least one plastic material is further comprised of at least one inorganic filler in an amount up to about 10 parts per 100 parts of said polypropylene resin.

10. The foamable composite of claim 1 wherein:

said at least one cellulosic filler is in an amount of about 40% to about 50% by weight of said composite; and said at least one plastic material is in an amount of about 50% to about 60% by weight of said composite, said at least one plastic material being comprised of said at least one stabilizer in an amount of about 3 to about 5 parts per 100 parts of said polypropylene resin, said at least one lubricant in an amount of about 3 to about 6 parts per 100 parts of said polypropylene resin, said at least one process aid in an amount of about 5 to about 10 parts per 100 parts of said polypropylene resin, and said at least one blowing agent in an amount of about 0.5 to about 2 parts per 100 parts of said polypropylene resin.

11. A siding unit comprising:

at least one row made from a foamable composite which has been foamed, said foamable composite comprising:

at least one cellulosic filler in an amount of about 20% to about 60% by weight of said composite; and at least one plastic material in an amount of about 40% to about 80% by weight of said composite, said at least one plastic material comprised of at least one stabilizer in an amount of about 1 to about 10 parts per 100 parts of a polymer resin, at least one lubricant in an amount of about 1 to about 12 parts per 100 parts of said polymer resin, at least one process aid in an amount of about 2 to about 15 parts per 100 parts of said polymer resin, and at least one blowing agent in an amount of about 0.25 to about 5 parts per 100 parts of said polymer resin.

12. The siding unit of claim 11 wherein said polymer resin is polyvinyl chloride.

13. The siding unit of claim 11 wherein said polymer resin is polypropylene.

14. The siding unit of claim 11 wherein said at least one plastic material is further comprised of at least one inorganic filler in an amount up to about 10 parts per 100 parts of said polymer resin.

15. The siding unit of claim 11 wherein:

said at least one cellulosic filler is in an amount of about 40% to about 50% by weight of said composite; and said at least one plastic material is in an amount of about 50% to about 60% by weight of said composite, said at least one plastic material being comprised of said at least one stabilizer in an amount of about 3 to about 5 parts per 100 parts of said polymer resin, said at least one lubricant in an amount of about 3 to about 6 parts per 100 parts of said polymer resin, said at least one process aid in an amount of about 5 to about 10 parts per 100 parts of said polymer resin, and said at least one blowing agent in an amount of about 0.5 to about 2 parts per 100 parts of said polymer resin.

16. A method of making a foam composite component independent of a pelletizing step, said method comprising:

providing a polymer resin, at least one stabilizer, at least one lubricant, at least one process aid, and at least one blowing agent;

mixing together said polymer resin, said at least one stabilizer, said at least one lubricant, said at least one process aid, and said at least one blowing agent to form a plastic material, said plastic material comprised of said at least one stabilizer in an amount of about 1 to about 10 parts per 100 parts of said polymer resin, said at least one lubricant in an amount of about 1 to about 12 parts per 100 parts of said polymer resin, said at least one process aid in an amount of about 2 to about 15 parts per 100 parts of said polymer resin, and said at least one blowing agent in an amount of about 0.25 to about 5 parts per 100 parts of said polymer resin;

providing said plastic material and at least one cellulosic filler to an extruder; and extruding a composite in a shape of said component, said composite comprising said at least one cellulosic filler in an amount of about 20% to about 60% by weight and said plastic material in an amount of about 40% to about 80% by weight.

17. The method of claim 16 wherein said polymer resin is polyvinyl chloride.

18. The method of claim 16 wherein said polymer resin is polypropylene.

19. The method of claim 16 wherein said plastic material is further comprised of at least one inorganic filler in an amount up to about 10 parts per 100 parts of said polymer resin.

20. The method of claim 16 wherein:

said at least one cellulosic filler is in an amount of about 40% to about 60% by weight of said composite; and said plastic material is in an amount of about 40% to about 60% by weight of said composite, said plastic material being comprised of said at least one stabilizer in an amount of about 3 to about 5 parts per 100 parts of said polymer resin, said at least one lubricant in an amount of about 3 to about 6 parts per 100 parts of said polymer resin, said at least one process aid in an amount of about 5 to about 10 parts per 100 parts of said polymer resin, and said at least one blowing agent in an amount of about 0.5 to about 2 parts per 100 parts of said polymer resin.

* * * * *